Oct. 9, 1962     G. B. STILLWAGON, JR     3,057,055
METHOD OF MAKING UNIVERSAL JOINTS
Original Filed May 5, 1955
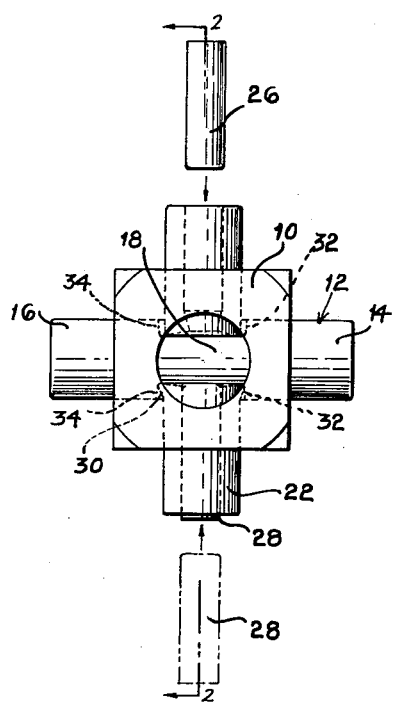
FIG. 1
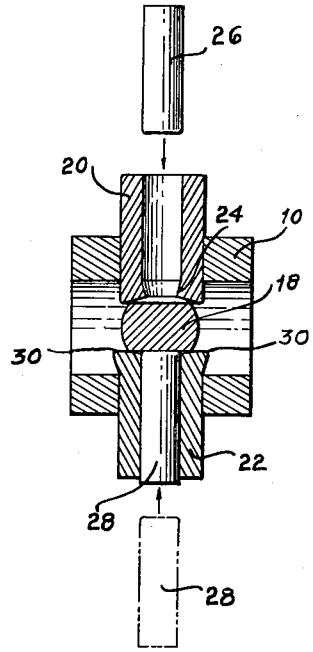
FIG. 2
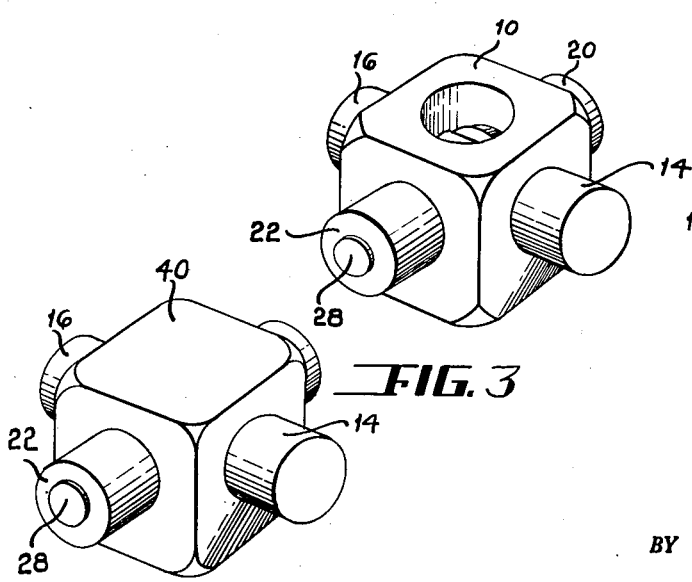
FIG. 3
FIG. 4
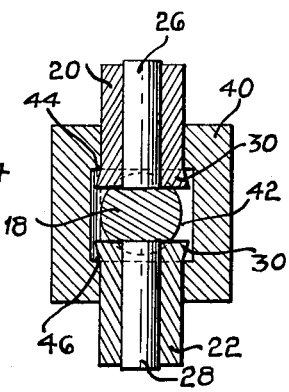
FIG. 5
INVENTOR.
GEORGE B. STILLWAGON JR.
BY
HIS ATTORNEYS United States Patent Office 3,057,055
Patented Oct. 9, 1962

3,057,055
METHOD OF MAKING UNIVERSAL JOINTS
George B. Stillwagon, Jr., Dayton, Ohio, assignor of one-half to Kenneth G. Fraser, Dayton, Ohio
Original application May 5, 1955, Ser. No. 506,240, now Patent No. 2,844,949, dated July 29, 1958. Divided and this application Mar. 21, 1958, Ser. No. 722,930
1 Claim. (Cl. 29—443)

This invention relates to a method of making universal joints, and more particularly to a method wherein the pinning construction for a universal joint is assembled with a swaging operation in such a manner that the arms associated with the pinning construction are non-removably secured, thus providing a durable and permanent universal joint.

The present application is a division of my copending application Serial No. 506,240, filed May 5, 1955, now Patent No. 2,844,949, and entitled Pinning Construction for Universal Joint.

An object of this invention is to provide a new and improved method for making a universal joint.

Another object of this invention is to provide a method for making a universal joint wherein the arms for the universal joint are locked into position by a swaging operation.

A further object of this invention is to provide a method for constructing universal joints wherein a swaging operation, which is easily and simply carried out, is employed to lock the arms for the universal joint into a central coupling block in such a manner that the arms are thereafter permanently retained by the coupling block.

Other objects and advantages reside in the construction of parts, the combination thereof, the method of manufacture and the mode of operation, as will become more apparent from the following description.

FIGURE 1 is a top plan view.

FIGURE 2 is a vertical cross section taken on the line 2—2 of FIGURE 1.

FIGURE 3 is a perspective view.

FIGURE 4 is a perspective view of a modified form of the invention; and

FIGURE 5 is a cross sectional view.

In describing this device, it has been found expedient to designate one portion as "the top" and to describe the remaining portions of the device relative thereto. It is to be understood, however, that the block and arms of this device may be used in any position deemed desirable, and the invention is in no way limited to any one position.

Referring more in detail to the drawing, a block 10 is used in supporting the pins which engage the yokes of a universal joint. This block is provided with a pair of borings, normally placed with reference to each other. A pin 12 is formed with arms 14 and 16, circular in cross section. It is also provided with an intermediate flattened portion on two surfaces thereof. The two flattened portions are located on opposite sides and lie in parallel planes. The pin 12 is inserted through one of the borings in the block, with arms protruding from opposite faces thereof. A pair of hollow substantially cylindrical arms are inserted into the remaining boring from opposite sides of the block 10, and are secured in place by swaging.

Before this process has taken place, the arms have the form shown at 20 in FIGURE 2. The hollow arm 20 has been machined so as to have a cylindrical bored portion merging into a tapered portion so that the inner ends are thickened to form an inward, annular, thickened lip portion 24.

The swage tool or pin 26 has an outer diameter such as to allow snug fitting into the cylindrical portion of the bore in the arm 20. The tool is then swaged inwardly into the tapered portion of the bore, enlarging it, and expanding the metal of the tapered portion of the bore outwardly. The operation is shown in process in the upper portion of FIGURE 2. The completion of the process is shown in the lower portion of FIGURE 2. The swage tool or pin 28 is swaged inwardly into the boring in the arm 22, in the same manner as described above. The thickened lips are forced outwardly to become annular heads, which are larger in diameter than the boring in the block 10. The thickened portion is located between the flattened portion 18 of the pin 12, and the transverse bore. A permanent attachment is thus formed. The flattened portion 18 receives the impact of the swaging pressure. The thickened portion 30 will also engage the shoulders 32 and 34 formed on the pin 12, so that lateral movement of the pin 12 is prevented. It will thus be seen that the two arms 20 and 22 are permanently attached to the block, and at the same time, the pin 12 is secured against detachment.

In the modification shown in FIGURES 4 and 5 a modified form of block is used. In all other respects, this form is identical with the form of the invention described above as related to FIGURES 1, 2 and 3.

There is no recess in the block 40 which is comparable to the recess in the top of the block 10. The block 40 is provided with normally positioned borings which are enlarged at the center of the block. The enlarged portions form a recess 42 which allows for the outward expansion of the outwardly swaged portions 30. The recess also provides shoulders 44 and 46 which act as stops to prevent the expanded portions 30 from becoming disengaged from the block 40.

In all other respects, the pin and arm construction is identical with that shown in FIGURES 1, 2 and 3, and described above in relation thereto.

Although the preferred embodiment of the device has been described, it will be understood that within the purview of this invention various changes may be made in the form, details, proportion and arrangement of parts, the combination thereof and mode of operation, which generally stated, consist in a device capable of carrying out the objects set forth, as disclosed and defined in the appended claim.

Having thus described my invention, I claim:

A method for making a pinning construction for universal joints, including the steps of providing a pair of normally disposed intersecting bores in a coupling block, providing recessed flattened portions on opposite sides of a unitary pin, inserting said unitary pin in one of said bores with the flattened portions thereof aligned with the other of said bores, providing an inwardly thickened portion adjacent one end of each of two hollow arms, projecting the inwardly thickened ends of said hollow arms through the opposite ends of the other of said bores into abutment with the flattened portions of said unitary pin, driving a snugly fitting swaging tool into permanent position in the hollow of each of said arms in abutment with said unitary pin, said swaging tools continuously displacing the inwardly thickened portions of said arms radially outwardly thereby forming shoulders on said arms for retaining said arms within said block.

References Cited in the file of this patent
UNITED STATES PATENTS

| | | |
|---|---|---|
| 608,178 | Cock | Aug. 2, 1898 |
| 998,587 | Mueller | July 18, 1911 |
| 1,371,750 | Fox | Mar. 15, 1921 |
| 1,832,954 | Weatherhead | Nov. 24, 1931 |
| 1,840,928 | Anthony | Jan. 12, 1932 |
| 2,146,461 | Bettington | Feb. 7, 1939 |
| 2,417,350 | Conroy | Mar. 11, 1947 |
| 2,670,647 | Jones | Mar. 2, 1954 |
| 2,958,127 | Johnson | Nov. 1, 1960 |